US012648071B1

(12) United States Patent
Muniz

(10) Patent No.: US 12,648,071 B1
(45) Date of Patent: Jun. 2, 2026

(54) ELECTRONIC DEVICE THAT TEMPORARILY TURNS OFF ONE HEADLIGHT ON A VEHICLE

(71) Applicant: Get Wiink, LLC, Spring, TX (US)

(72) Inventor: Jason Muniz, Spring, TX (US)

(73) Assignee: Get Wiink, LLC, Spring, TX (US)

( * ) Notice: Subject to any disclaimer, the term of this patent is extended or adjusted under 35 U.S.C. 154(b) by 21 days.

(21) Appl. No.: 18/963,984

(22) Filed: Nov. 29, 2024

(51) Int. Cl.
H05B 47/19 (2020.01)
B60Q 1/00 (2006.01)
B60Q 1/04 (2006.01)

(52) U.S. Cl.
CPC ........... H05B 47/19 (2020.01); B60Q 1/0094 (2013.01); B60Q 1/04 (2013.01); B60Q 2300/05 (2013.01)

(58) Field of Classification Search
CPC ........ H05B 47/19; B60Q 1/0094; B60Q 1/04; B60Q 2300/05
See application file for complete search history.

(56) References Cited

U.S. PATENT DOCUMENTS

| | | | | |
|---|---|---|---|---|
| 12,122,287 | B1 * | 10/2024 | Moorman ................ | B60Q 1/18 |
| 2013/0020937 | A1 * | 1/2013 | Tatara .................... | H05B 47/19 |
| | | | | 315/77 |

| | | | | |
|---|---|---|---|---|
| 2013/0175937 | A1 * | 7/2013 | Nakajo ................. | H02J 50/402 |
| | | | | 315/276 |
| 2015/0145433 | A1 * | 5/2015 | Hiramatu ............... | H05B 45/50 |
| | | | | 315/291 |
| 2017/0142800 | A1 * | 5/2017 | Schultheis ............ | F21S 41/125 |
| 2025/0212307 | A1 * | 6/2025 | Park ...................... | F21S 43/401 |

FOREIGN PATENT DOCUMENTS

| | | | | | |
|---|---|---|---|---|---|
| CN | 102869541 | A | * | 1/2013 | ............. H05B 47/19 |
| DE | 102024205986 | A1 | * | 12/2025 | ........ F21S 43/26411 |
| JP | 2020179700 | A | * | 11/2020 | |
| WO | WO-2021060094 | A1 | * | 4/2021 | ............. B60Q 1/547 |
| WO | WO-2026002564 | A1 | * | 1/2026 | |

* cited by examiner

*Primary Examiner* — Adam D Houston

(74) *Attorney, Agent, or Firm* — Craig A. Simmermon

(57) ABSTRACT

An after-market electronic device that is installed into a vehicle and functions to temporarily interrupt electrical power to one headlight on the vehicle in order to yield the appearance that the vehicle is 'winking'. The electronic device temporarily cuts power to one headlight while the control button is pressed and returns power to the headlight when the control button is released. The electronic device includes a receiver component that is installed under the hood of the vehicle and a control button or transmitter component that is installed in the cab of the vehicle.

1 Claim, 6 Drawing Sheets

*40*

*40, 54*

*40*

*40, 54*

*40*

*40, 54*

ELECTRONIC DEVICE THAT TEMPORARILY TURNS OFF ONE HEADLIGHT ON A VEHICLE

BACKGROUND OF THE INVENTION

1. Field of the Invention

This invention relates to an after-market electronic device that is installed into a vehicle and functions to temporarily interrupt electrical power to one headlight on the vehicle in order to yield the appearance that the vehicle is 'winking'. The electronic device temporarily cuts power to one headlight while the control button is pressed and returns power to the headlight when the control button is released. The electronic device includes a receiver component that is installed under the hood of the vehicle and a control button or transmitter component that is installed in the cab of the vehicle.

2. Description of Related Art

There are many after-market automotive electronic devices in the prior art. However, there are none that include a specially designed receiver unit that is hard wired to the existing electrical wiring of one headlight on a vehicle as shown and described below, as well as, a specially designed wireless transmitter unit that is installed inside the cab of the vehicle that controls the receiver unit with radio frequency wave.

BRIEF SUMMARY OF THE INVENTION

It is an aspect of electronic device that temporarily turns off one headlight on a vehicle to include a special receiver unit that is wirelessly linked to a special transmitter unit.

It is an aspect of electronic device that temporarily turns off one headlight on a vehicle to include a special transmitter unit that is wirelessly linked to a special receiver unit.

It is an aspect of the special receiver unit to include a radio frequency receiver, an antenna, and an electrical relay.

It is an aspect of the special receiver unit to include various electrical connectors that allow the special receiver unit to be easily spliced into and installed into the existing wiring of a headlight on a vehicle.

It is an aspect of the special receiver unit to include various electrical connectors that allow the special receiver unit to be easily removed without any tools after being installed into the existing wiring of a headlight on a vehicle.

It is an aspect of the special receiver unit to include a protective case with a mounting hole on it to allow the special receiver unit to be affixed or mounted under the hood of a vehicle.

It is an aspect of the special receiver unit to receive radio signals from the special transmitter unit.

It is an aspect of the special receiver unit to shut off electrical power to a headlight of a vehicle on demand and upon the pressing of an operating button on the special transmitter unit.

It is an aspect of the special transmitter unit to include a radio frequency transmitter, an antenna, and a battery.

It is an aspect of the special transmitter unit to include an operating button that turns on the radio frequency transmitter.

It is an aspect of the special transmitter unit to transmit a radio signal to the special receiver unit.

It is an aspect of the special transmitter unit to be installed within the cab or interior of a vehicle without tools and without splicing into any existing wiring of the vehicle.

| DEFINITION LIST | |
| --- | --- |
| Term | Definition |
| 5 | Electronic Device that Temporarily Turns Off One Headlight on a Vehicle |
| 10 | Receiver Unit |
| 12 | Radio Frequency Receiver |
| 14 | Receiver Antenna |
| 16 | Receiver Relay |
| 17 | First Input Terminal |
| 18 | Second Input Terminal |
| 19 | First Operating Terminal |
| 20 | Second Operating Terminal |
| 22 | Receiver Printed Circuit Board |
| 24 | Receiver Input Wire |
| 26 | Receiver Input Connector |
| 28 | Receiver Output Wire |
| 30 | Receiver Output Connector |
| 32 | Receiver Ground Wire |
| 33 | Receiver Ground Wire Connector |
| 34 | Low Beam Wire First Connector |
| 36 | Low Beam Wire Second Connector |
| 38 | Receiver Unit Case |
| 39 | Mounting Hole on Receiver Unit Case |
| 40 | Transmitter Unit |
| 42 | Transmitter Unit Button |
| 44 | Radio Frequency Transmitter |
| 46 | Transmitter Antenna |
| 48 | Transmitter Switch |
| 50 | Transmitter Battery |
| 52 | Transmitter Printed Circuit Board |
| 54 | Transmitter Unit Case |
| 100 | Headlight on Vehicle |
| 102 | Low Beam Wire on Headlight |
| 104 | High Beam Wire on Headlight |
| 106 | Ground Wire on Headlight |
| 108 | Low Beam Relay on Vehicle |
| 110 | High Beam Relay on Vehicle |
| 112 | Battery on Vehicle |
| 114 | Headlight Switch on Vehicle |
| 116 | Electrical Tape |

DETAILED DESCRIPTION OF THE INVENTION

Figure 1:
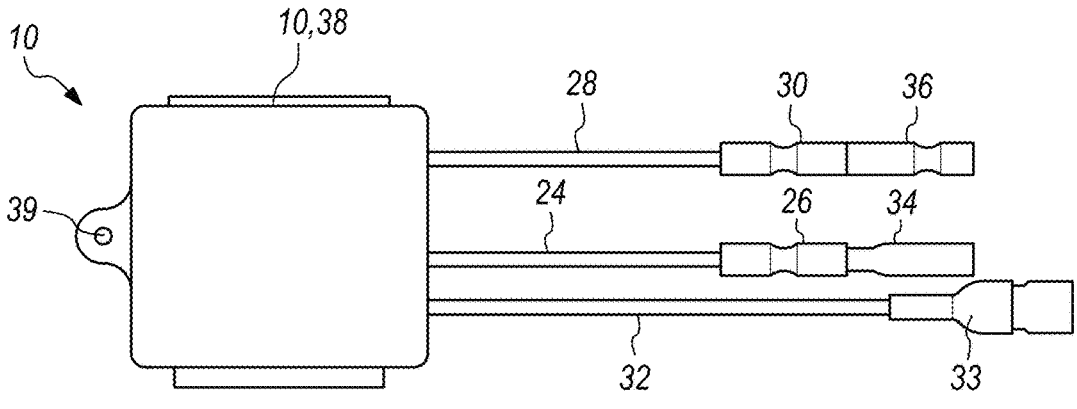
FIG. 1 is a top plan view of the receiver unit.
Figure 2:
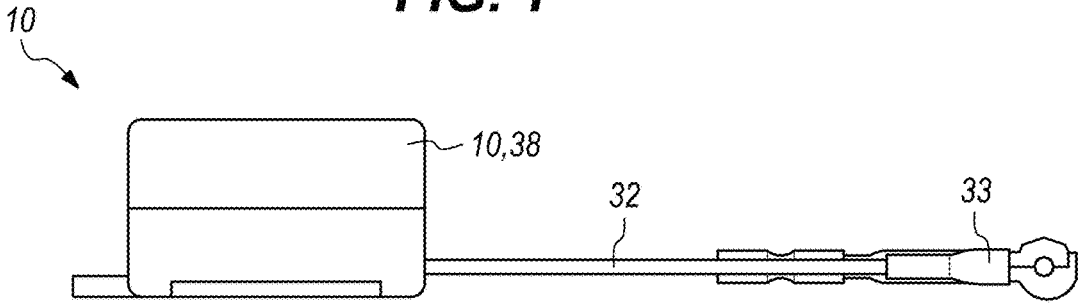
FIG. 2 is a side elevation view of the receiver unit.
Figure 3:
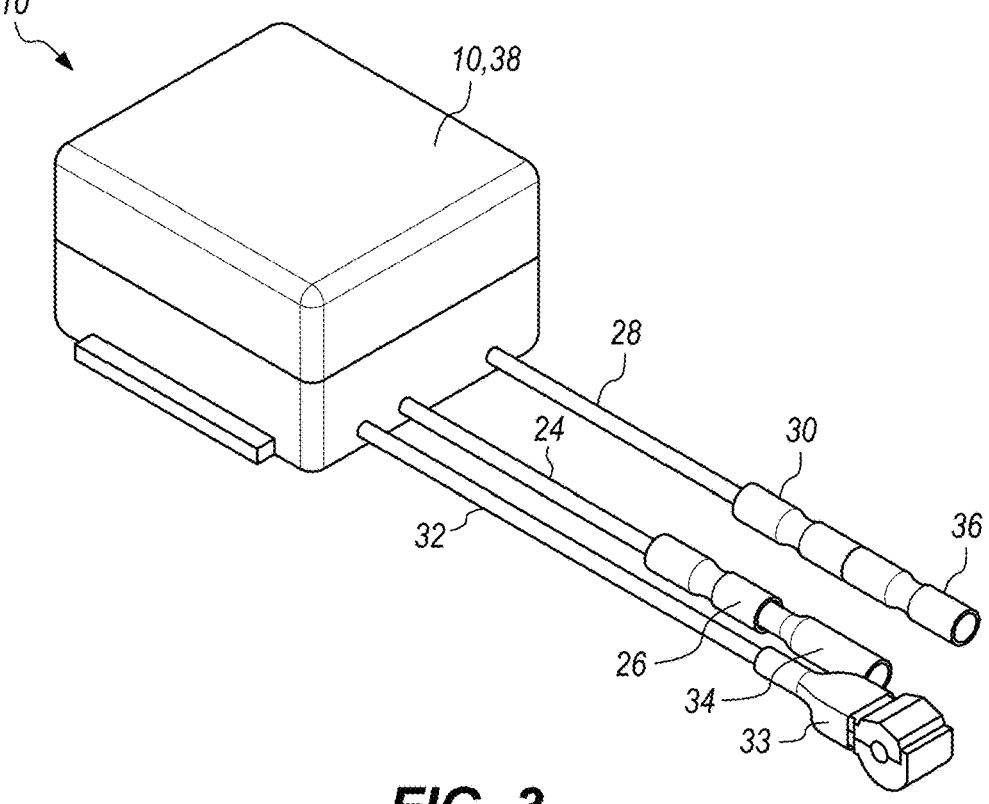
FIG. 3 is a perspective view of the receiver unit.
Figure 4:
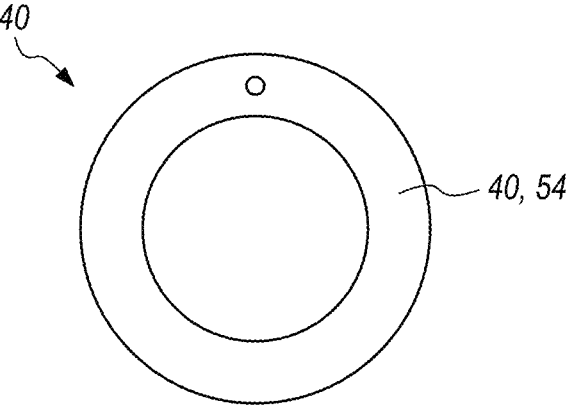
FIG. 4 is a top plan view of the transmitter unit.
Figure 5:
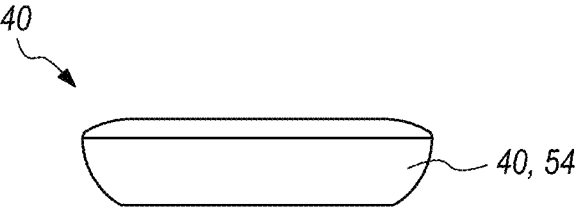
FIG. 5 is a side elevation view of the transmitter unit.
Figure 6:
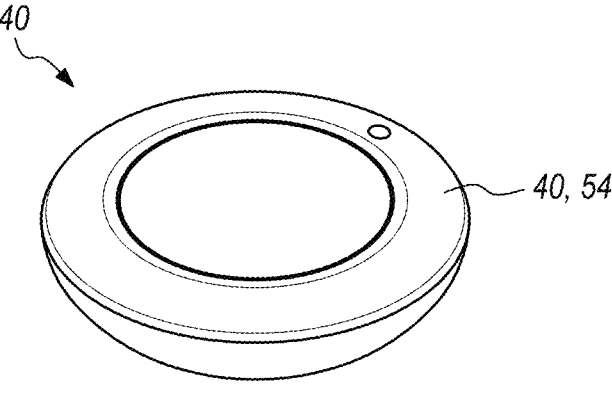
FIG. 6 is a perspective view of the transmitter unit.
Figure 7:
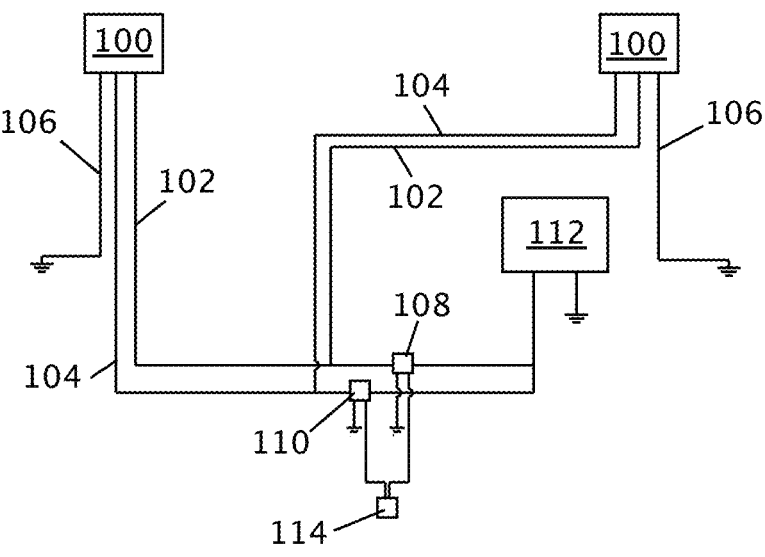
FIG. 7 is a circuit diagram of the headlight wiring of a vehicle before installing electronic device that temporarily turns off one headlight on a vehicle.
Figure 8:
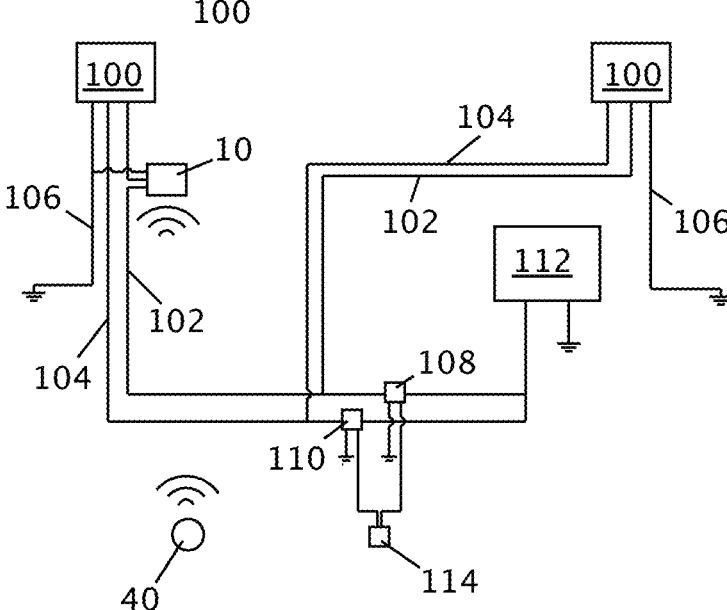
FIG. 8 is a circuit diagram of the headlight wiring of a vehicle after installing electronic device that temporarily turns off one headlight on a vehicle.
Figure 9:
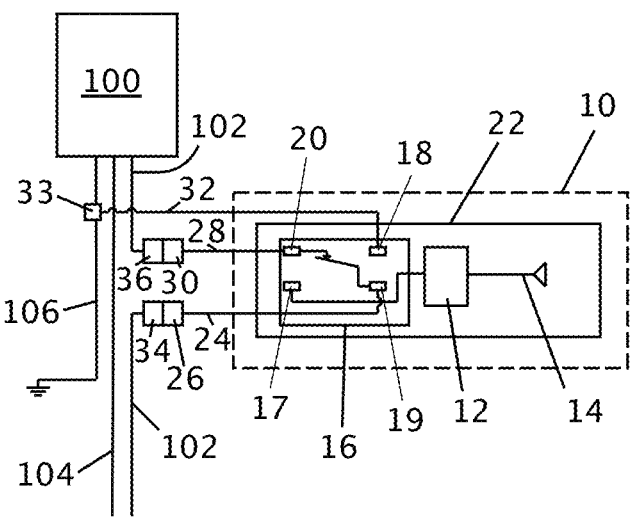
FIG. 9 is a circuit diagram of the receiver unit installed into the headlight wiring of a vehicle when the transmitter unit button is not depressed.

A basic circuit diagram of the headlights of any vehicle is depicted in FIG. 8. A headlight switch 114 controls a low beam relay 108 which controls the low beams on the headlights 100 of the vehicle. The same headlight switch 114 also controls a high beam relay 110 which controls the high beams on the headlights 100 of the vehicle. The vehicles battery 112, of course, powers the headlights 100 and is depicted in the circuit diagram. FIG. 9 depicts the basic circuit diagram of FIG. 8 with the electronic device that temporarily turns off one headlight on a vehicle 5 installed therein. FIG. 8 depicts the addition of the receiver unit 10 into the circuit diagram near the headlight 100 of the vehicle. FIG. 8 depicts the addition of the transmitter unit 40 as a free floating disconnected entity because it is a wireless controller with its own power source that can be placed anywhere inside the cab of the vehicle without connecting it to any wiring or other electronics.

Electronic device that temporarily turns off one headlight on a vehicle 5 comprises: a receiver unit 10 and a transmitter unit 40. The receiver unit 10 is installed under the hood of a vehicle and the transmitter unit 40 is installed inside the cab or interior of the vehicle. Electronic device that temporarily turns off one headlight on a vehicle 5 functions by pressing and holding the transmitter unit button 42 on the transmitter unit 40 in order to turn off one headlight while the transmitter unit button 42 is depressed. Then, the transmitter unit button 42 is released in order to turn the headlight back on. The act of temporarily turning off one headlight on the vehicle gives off the appearance that the vehicle is winking, which is desirous of many drivers. This invention is marketed under the trademark of WIINK®.

Receiver unit 10 comprises: a radio frequency receiver 12; a receiver antenna 14; a receiver relay 16; a receiver printed circuit board 22; a receiver input wire 24; a receiver input connector 26; a receiver output wire 28; a receiver output connector 30; a receiver ground wire 32; a receiver ground wire connector 33; a low beam wire first connector 34; a low beam wire second connector 36; and a receiver unit case 38.

Radio frequency receiver 12 is a small electronic device used to receive radio signals generated from a transmitter or another electronic device through an antenna to allow wireless communication between the two electronic devices. Radio frequency (RF) communication is widely used in electronic design. Good electronic radio design is notoriously complex because of the sensitivity of radio circuits and the accuracy of components and layouts required to achieve proper operation on a specific frequency. In addition, reliable RF communication circuit requires careful monitoring of the manufacturing process to ensure that the RF performance is not adversely affected. Finally, radio circuits are usually subject to limits on radiated emissions, and require conformance testing and certification by a standardization organization such as ETSI or the U.S. Federal Communications Commission (FCC). RF communication modules are most often used in medium and low volume products for consumer applications such as garage door openers, wireless alarm or monitoring systems, industrial remote controls, smart sensor applications, and wireless home automation systems. RF communication modules are sometimes used to replace older infrared communication designs because they have the advantage of not requiring line-of-sight operation. Several carrier frequencies are commonly used in commercially available RF modules, including those in the industrial, scientific and medical (ISM) radio bands such as 315 MHz, 433.92 MHz, 868 MHz, 915 MHz, and 2400 MHz. These frequencies are used because of national and international regulations governing the use of radio for communication. RF communication modules may comply with a defined protocol for RF communications such as Zigbee, Bluetooth Low Energy, or Wi-Fi, or they May implement a proprietary protocol. In this case, applicant has sourced a short range transmitter/receiver pair that transmits at 250 to 500 Megahertz.

Radio frequency receiver 12 is a short range receiver that receives signals at 250 to 500 Megahertz. When radio frequency transmitter 44 is turn on, radio frequency receiver 12 receives and registers the receipt of short-range radio frequency waves at 250 to 500 Megahertz. There may optionally be a manual toggle switch located on the radio frequency receiver 12 that allows the user to toggle between different frequencies. Radio frequency receiver 12 does not have a battery and a battery is not required for radio frequency transmitter 44 to receive and register the receipt of short-range radio frequency waves at 250 to 500 Megahertz. Radio frequency receiver 12 is rigidly attached to the receiver printed circuit board 22. There is a first terminal or contact on radio frequency receiver 12 that is connected to first input terminal 17 of receiver relay 16 so that there is electrical continuity between these members. There is second terminal or contact on radio frequency receiver 12 that is connected to receiver antenna 14 so that there is electrical continuity between these members. These electrical connections are accomplished by the receiver printed circuit board 22. Radio frequency receiver 12 functions by receiving a radio frequency signal from receiver antenna 14 and then passing this signal out to input terminals 17 and 18 on the receiver relay 16.

Receiver antenna 14 is a small electronic device that is the interface between radio waves propagating through space and electric currents moving in metal conductors, used with a transmitter or receiver. In transmission, a radio transmitter supplies an electric current to the antenna's terminals, and the antenna radiates the energy from the current as electromagnetic waves or radio waves. In reception, an antenna intercepts some of the power of a radio wave in order to produce an electric current at its terminals, that is applied to a receiver to be amplified. Antennas are essential components of all radio equipment. Strong directivity and good efficiency when transmitting are hard to achieve with antennas with dimensions that are much smaller than a half wavelength of the frequency being transmitted. Receiver antenna 14 is rigidly attached to the receiver printed circuit board 22. Receiver antenna 14 is connected to radio frequency receiver 12 so that there is electrical continuity between these members. This electrical connection is accomplished by the receiver printed circuit board 22, as depicted in the circuit diagrams of FIGS. 9 and 10.

Receiver relay 16 is a small electronic device that is an electrically operated switch known as a relay. Relays are commonly known in electronics. Relays are used where it is necessary to control one or more circuits by an independent low-power signal. Receiver relay 16 is commonly known as a 4-pin normally closed relay. Receiver relay 16 comprises two input terminals or contacts for a control signal and two operating terminals or contacts for switch operation of an exterior circuit. The traditional electromechanical form of a relay uses an electromagnet to open or close the operating terminals or contacts, but relays using other operating principles have also been invented, such as in solid-state relays which use semiconductor properties for control without relying on moving parts. Any known type of 4-pin normally closed relay may be used. Receiver relay 16 is rigidly attached to the receiver printed circuit board 22.

Receiver relay 16 has a first input terminal 17, a second input terminal 18, a first operating terminal 19, and a second operating terminal 20. First input terminal 17 is connected to radio frequency receiver 12 so that there is electrical continuity between these members. Second input terminal 18 is connected to receiver ground wire 32 so that there is electrical continuity between these members. First operating terminal 19 is connected to receiver input wire 24 so that there is electrical continuity between these members. Second operating terminal 20 is connected to receiver output wire 28 so that there is electrical continuity between these members. These electrical connections are accomplished by the receiver printed circuit board 22 as depicted in the circuit diagrams of FIGS. 9 and 10.

Receiver printed circuit board 22 is a rigid structure that contains electrical circuitry that is used to connect or "wire" components to one another in various circuits. The rigid structure is a laminated sandwich of conductive and insulating layers where each of the conductive layers is designed with a pattern of traces, planes and other features (similar to wires on a flat surface) etched from one or more sheet layers of copper laminated onto and/or between sheet layers of a non-conductive substrate. Electrical components are fixed to conductive pads on the outer layers in a shape designed to accept the component's terminals, generally by means of soldering, to both electrically connect and mechanically fasten them to the rigid structure. All connections between all electrical components of on receiver unit 10 are accomplished by the pattern of traces, planes and other features on the receiver printed circuit board 22.

Receiver input wire 24 is a length of metallic wire coated with a layer of insulating material that is capable of conducting an electric current or signal from one end to another. Any known type of electrical wiring may be used. Receiver input wire 24 has a first and a second end. The first end of receiver input wire 24 is connected to and attached to receiver input connector 26 so that there is electrical continuity between these members. The second end of receiver input wire 24 is connected to and attached to receiver printed circuit board 22 so that there is electrical continuity between these members. Through electrical connections in the receiver printed circuit board 22, the second end of receiver input wire 24 is connected to the first operating terminal 19 of receiver relay 16, as depicted in the circuit diagrams of FIGS. 9 and 10.

Receiver input connector 26 is an electrical connector that is an electromechanical device used to create an electrical connection between parts of an electrical circuit. Electrical connector are commonly known in the field of electronics. Receiver input connector 26 may be any known type of connector such as a spade connector or a bullet connector. Receiver input connector 26 may be a male or female connector. As stated, receiver input connector 26 is connected to the first end of receiver input wire 24 and the electronic device that temporarily turns off one headlight on a vehicle 5 is sold to consumers with the receiver input connector 26 already attached and connected to the first end of receiver input wire 24. During installation of electronic device that temporarily turns off one headlight on a vehicle 5, the consumer must connect the receiver input connector 26 to low beam wire first connector 34 so that there is electrical continuity between these members. If receiver input connector 26 is male, then low beam wire first connector 34 must be female, and vice versa, in order for the two connecters to properly mate and connect with each other and also properly disconnect from each other. Also, if receiver input connector 26 is male, then receiver output connector 30 must be female, and vice versa. This aspect is required in order to connect low beam wire first connector 34 to low beam wire second connector 36 in the event that the consumer would like to remove the of electronic device that temporarily turns off one headlight on a vehicle 5 from their vehicle after installation.

Receiver output wire 28 is a length of metallic wire coated with a layer of insulating material that is capable of conducting an electric current or signal from one end to another. Any known type of electrical wiring may be used. Receiver output wire 28 has a first and a second end. The first end of receiver output wire 28 is connected to and attached to receiver printed circuit board 22 so that there is electrical continuity between these members. Through electrical connections in the receiver printed circuit board 22, the first end of receiver output wire 28 is connected to the second operating terminal 20 of receiver relay 16, as depicted in the circuit diagrams of FIGS. 9 and 10. The second end of receiver output wire 28 is connected to and attached to receiver output connector 30 so that there is electrical continuity between these members.

Receiver output connector 30 is an electrical connector that is an electromechanical device used to create an electrical connection between parts of an electrical circuit. Electrical connector are commonly known in the field of electronics. Receiver output connector 30 may be any known type of connector such as a spade connector or a bullet connector. Receiver output connector 30 may be a male or female connector. As stated, receiver output connector 30 is connected to the second end of receiver output wire 28, wherein the electronic device that temporarily turns off one headlight on a vehicle 5 is sold to consumers with the receiver output connector 30 already attached and connected to the second end of receiver output wire 28. During installation of electronic device that temporarily turns off one headlight on a vehicle 5, the consumer must connect the receiver output connector 30 to low beam wire second connector 36 so that there is electrical continuity between these members. If receiver output connector 30 is male, then low beam wire second connector 36 must be female, and vice versa, in order for the two connecters to properly mate and connect with each other and also properly disconnect from each other. Also, if receiver output connector 30 is male, then receiver input connector 26 must be female, and vice versa. This aspect is required in order to connect low beam wire first connector 34 to low beam wire second connector 36 in the event that the consumer would like to remove the of electronic device that temporarily turns off one headlight on a vehicle 5 from their vehicle after installation.

Receiver ground wire 32 is a length of metallic wire coated with a layer of insulating material that is capable of conducting an electric current or signal from one end to another. Any known type of electrical wiring may be used. Receiver ground wire 32 has a first and a second end. The first end of receiver ground wire 32 is connected to and attached to receiver printed circuit board 22 so that there is electrical continuity between these members. Through electrical connections in the receiver printed circuit board 22, the first end of receiver ground wire 32 is connected to the second input terminal 18 of receiver relay 16, as depicted in the circuit diagrams of FIGS. 9 and 10. The second end of receiver ground wire 32 is connected to and attached to receiver ground wire connector 33 so that there is electrical continuity between these members.

Receiver ground wire connector 33 is an electrical connector that is an electromechanical device used to create an electrical connection between parts of an electrical circuit. Receiver ground wire connector 33 is a splice connector or in-line connector. A splice connector is commonly known in the field of electronics. A splice connector is a connector that is capable of electrically connecting to an existing wire without cutting or modifying the existing wire where the splice connector penetrates the insulating cover of the existing wire and the connects with the metallic wire inside in order to connect with and create electrical continuity between these members. During installation of electronic device that temporarily turns off one headlight on a vehicle 5, receiver ground wire connector 33 must be installed on or connected to headlight ground wire 106 so that there is electrical continuity between these members. To install receiver ground wire connector 33, receiver ground wire connector 33 is positioned over or around headlight ground wire 106 at a location near the headlight 100 and squeezed or crimped in order to operate and install the splice connector to penetrate the insulation layer of the headlight ground wire 106 and connect with and attach to the metallic wire inside of the headlight ground wire 106 to create electrical continuity between the receiver ground wire connector 33 and headlight ground wire 106. This electrical connection is depicted in the circuit diagrams of FIGS. 9 and 10.

Low beam wire first connector 34 is an electrical connector that is an electromechanical device used to create an electrical connection between parts of an electrical circuit. Low beam wire first connector 34 may be any known type of connector such as a spade connector or a bullet connector. Low beam wire first connector 34 may be a male or female connector. If receiver input connector 26 is male, then low beam wire first connector 34 must be female, and vice versa, in order for the two connecters to properly mate and connect with each other and also properly disconnect from each other. Low beam wire first connector 34 is reversibly attachable and reversibly connectable to receiver input connector 26 without the use of any tools. Low beam wire first connector 34 is reversibly attachable and reversibly connectable to low beam wire second connector 36 without the use of any tools. Thus, low beam wire first connector may be disconnected from receiver input connector 26 and connected to low beam wire second connector 36 without the use of any tools.

During installation of electronic device that temporarily turns off one headlight on a vehicle 5, low beam wire first connector 34 must be installed on or connected to low beam wire 102 so that there is electrical continuity between these members. To install low beam wire first connector 34, the low beam wire 102 of the vehicle must be cut or severed at a location proximal to the vehicle headlight 100. The cutting of the low beam wire 102 creates a first end and a second end of low beam wire 102. The first end of low beam wire 102 is the end that is closest to the cab or interior of the vehicle. The second end of the low beam wire 102 is the other end or the end that is closest to the headlight 100. Next, a first end of low beam wire first connector 34 is attached to the first end of low beam wire 102 so that there is electrical continuity between these members. Any known method of attachment may be used such as soldering or crimping. A second end of low beam wire first connector 34 must be reversibly connectable to receiver input connector 26 without the use of any tools and vice versa. This electrical connection is depicted in the circuit diagrams of FIGS. 9 and 10.

Low beam wire second connector 36 is an electrical connector that is an electromechanical device used to create an electrical connection between parts of an electrical circuit. Low beam wire second connector 36 may be any known type of connector such as a spade connector or a bullet connector. Low beam wire second connector 3 may be a male or female connector. If receiver output connector 30 is male, then low beam wire second connector 36 must be female, and vice versa, in order for the two connecters to properly mate and connect with each other and also properly disconnect from each other. Low beam wire second connector 36 is reversibly attachable and reversibly connectable to receiver output connector 30 without the use of any tools. Low beam wire second connector 36 is reversibly attachable and reversibly connectable to low beam wire first connector 34 without the use of any tools. Thus, low beam wire second connector 36 may be disconnected from receiver output connector 30 and connected to low beam wire first connector 34 without the use of any tools.

During installation of electronic device that temporarily turns off one headlight on a vehicle 5, low beam wire second connector 36 must be installed on or connected to low beam wire 102 so that there is electrical continuity between these members. To install low beam wire second connector 36, the low beam wire 102 of the vehicle must be cut or severed at a location proximal to the vehicle headlight 100. The cutting of the low beam wire 102 creates a first end and a second end of low beam wire 102. The first end of low beam wire 102 is the end that is closest to the cab or interior of the vehicle. The second end of the low beam wire 102 is the other end or the end that is closest to the headlight 100. Next, a first end of low beam wire second connector 36 is attached to the second end of low beam wire 102 so that there is electrical continuity between these members. Any known method of attachment may be used such as soldering or crimping. A second end of low beam wire second connector 36 must be reversibly connectable to receiver output connector 30 without the use of any tools and vice versa. This electrical connection is depicted in the circuit diagrams of FIGS. 9 and 10.

Receiver unit case 38 is a rigid hollow box shaped member or box shaped member with rounded edges. Receiver unit case 38 functions to house and protect all electrical components of the receiver unit 10 wherein the receiver printed circuit board 22 with all attached electrical components is securely installed within receiver unit case 38 and rigidly attached to the interior of the receiver unit case 38. Receiver unit case 38 may be a hinged clamshell design that opens and closes in order install the receiver printed circuit board 22 with all attached electrical components. Receiver unit case 38 may further comprise a mounting hole 39 that is used to mount and hold the receiver unit 10 under the hood of the vehicle.

Transmitter unit 40 comprises: a transmitter unit button 42; a radio frequency transmitter 44; a transmitter antenna 46; a transmitter switch 48; a transmitter battery 50; a transmitter printed circuit board 52; and a transmitter unit case 54.

Transmitter unit button 42 is a knob or push switch that is pressed in order to switch on or operate the radio frequency transmitter 44. Transmitter unit button 42 is a user interface which a user can press in order to energize or power up the radio frequency transmitter 44. Transmitter unit button 42 is an electrical switch which closes the electrical circuit between the transmitter battery 50 and the radio frequency transmitter 44. Any known type of button, user interface, or graphical user interface may be used. Transmitter unit button 42 is connected to and attached to receiver printed circuit board 22 so that there is electrical continuity between these members. Through electrical connections in the receiver printed circuit board 22, the transmitter unit button 42 is indirectly connected to both the transmitter battery 50 and the radio frequency transmitter 44, as depicted in the circuit diagram of FIG. 11.

Radio frequency transmitter 44 is a small electronic device used to generate and transmit radio signals to a receiver or another electronic device to allow wireless communication between the two electronic devices. Radio frequency (RF) communication is widely used in electronic design. Good electronic radio design is notoriously complex because of the sensitivity of radio circuits and the accuracy of components and layouts required to achieve proper operation on a specific frequency. In addition, reliable RF communication circuit requires careful monitoring of the manufacturing process to ensure that the RF performance is not adversely affected. Finally, radio circuits are usually subject to limits on radiated emissions, and require conformance testing and certification by a standardization organization such as ETSI or the U.S. Federal Communications Commission (FCC). RF communication modules are most often used in medium and low volume products for consumer applications such as garage door openers, wireless alarm or monitoring systems, industrial remote controls, smart sensor applications, and wireless home automation systems. RF communication modules are sometimes used to replace older infrared communication designs because they have the advantage of not requiring line-of-sight operation. Several carrier frequencies are commonly used in commercially available RF modules, including those in the industrial, scientific and medical (ISM) radio bands such as 315 MHz, 433.92 MHz, 868 MHz, 915 MHz, and 2400 MHz. These frequencies are used because of national and international regulations governing the use of radio for communication. RF communication modules may comply with a defined protocol for RF communications such as Zigbee, Bluetooth Low Energy, or Wi-Fi, or they may implement a proprietary protocol. In this case, applicant has sourced a short range transmitter/receiver pair that transmits at 250 to 500 Megahertz. Radio frequency transmitter 44 is a short range transmitter that transmits at 250 to 500 Megahertz. When radio frequency transmitter 44 is turn on or powered up, it transmits short-range radio frequency waves at 250 to Megahertz. There is a manual toggle switch located on the radio frequency transmitter 44 that allows the user to toggle between 250 to 500 Megahertz. Radio frequency transmitter 44 is rigidly attached to the transmitter printed circuit board 52. There is a first terminal or contact on radio frequency transmitter 44 that is connected to transmitter unit button 42 so that there is electrical continuity between these members. There is second terminal or contact on radio frequency transmitter 44 that is connected to the transmitter battery 50 so that there is electrical continuity between these members. These electrical connections are accomplished by the receiver printed circuit board 22, as depicted in the circuit diagram of FIG. 11.

Transmitter antenna 46 is a small electronic device that generates radio waves and is the interface between radio waves propagating through space and electric currents moving in metal conductors in a transmitter or receiver. In transmission, a radio transmitter supplies an electric current to the antenna's terminals, and the antenna radiates the energy from the current as electromagnetic waves or radio waves. In reception, an antenna intercepts some of the power of a radio wave in order to produce an electric current at its terminals, that is applied to a receiver to be amplified. Antennas are essential components of all radio equipment. Strong directivity and good efficiency when transmitting are hard to achieve with antennas with dimensions that are much smaller than a half wavelength of the frequency being transmitted. Transmitter antenna 46 is rigidly attached to the transmitter printed circuit board 52. Transmitter antenna 46 is connected to radio frequency transmitter 44 so that there is electrical continuity between these members. This electrical connection is accomplished by the transmitter printed circuit board 52, as depicted in the circuit diagram of FIG. 11.

Transmitter switch 48 is an electrical component that can disconnect or connect the conducting path in an electrical circuit, interrupting the electric current from one conductor to another. Transmitter switch 48 is an electromechanical device consisting of one set of movable electrical contacts connected to an external circuit. When a pair of contacts is touching current can pass between them to energize the external circuit, while when the contacts are separated, no current can flow to the external circuit. Transmitter switch 48 is a part of transmitter unit button 42. Transmitter switch 48 and transmitter unit button 42 are depicted in the circuit diagram on FIG. 11. Transmitter switch 48 is rigidly attached to the transmitter printed circuit board 52. Any known type of switch may be used.

Transmitter battery 50 is a source of electric power consisting of one or more electrochemical cells with external connections for powering electrical devices. When a battery is supplying power, its positive terminal is the cathode and its negative terminal is the anode. The terminal marked negative is the source of electrons that will flow through an external electric circuit to the positive terminal. When a battery is connected to an external electric load, a redox reaction converts high-energy reactants to lower-energy products, and the free-energy difference is delivered to the external circuit as electrical energy. In best mode, transmitter battery 50 is a 3 volt direct current button battery, however, any known type of direct current battery may be used. Transmitter battery 50 is rigidly attached to the transmitter printed circuit board 52. Transmitter battery 50 is connected to radio frequency transmitter 44 and transmitter unit button 42 so that there is electrical continuity between these members. These electrical connections are accomplished by the transmitter printed circuit board 52, as depicted in the circuit diagram of FIG. 11.

Transmitter printed circuit board 52 is a rigid structure that contains electrical circuitry that is used to connect or "wire" components to one another in various circuits. The rigid structure is a laminated sandwich of conductive and insulating layers where each of the conductive layers is designed with a pattern of traces, planes and other features (similar to wires on a flat surface) etched from one or more sheet layers of copper laminated onto and/or between sheet layers of a non-conductive substrate. Electrical components are fixed to conductive pads on the outer layers in a shape designed to accept the component's terminals, generally by means of soldering, to both electrically connect and mechanically fasten them to the rigid structure. All connections between all electrical components of on transmitter unit 40 are accomplished by the pattern of traces, planes and other features on the transmitter printed circuit board 52.

Transmitter unit case 54 is a rigid hollow cylindrical shaped member or cylindrical shaped member with rounded edges. Transmitter unit case 54 functions to house and protect all electrical components of the transmitter unit 40 wherein the transmitter printed circuit board 52 with all attached electrical components is securely installed within transmitter unit case 54 and rigidly attached to the interior of the transmitter unit case 54. Transmitter unit case may be a clamshell design that snaps open and snaps closed in order install the transmitter printed circuit board 52 with all attached electrical components. Transmitter unit case 54 may further comprise double sided tape or other adhesive on its back side that is used to mount and hold the transmitter unit 40 on the dash or inside the cab of the vehicle.

Electronic device that temporarily turns off one headlight on a vehicle 5 is installed into a vehicle as follows. The consumer must locate the low beam wire 102 leading into the headlight 100. On Jeep® vehicles, the low beam wire 102 is usually a white wire with a blue stripe. The consumer must cut or sever the low beam wire 102 at a location that is about 5-10 inches from the headlight 100. Next, the consumer must strip each end of the cut low beam wire 102 and perform all other preparations required to properly attach an electrical connector to each end of the cut low beam wire 102. Next, the consumer must properly attach low beam wire first connector 34 to the end of the cut low beam wire 102 closest to the cab or interior of the vehicle or rear of vehicle. Next, the consumer must properly attach low beam wire second connector 36 to the end of the cut low beam wire 102 closest to the headlight 100 or front of vehicle. Then the consumer must attach the receiver ground wire connector 33 to the ground wire 106 leading to headlight 100. On most vehicles, the ground wire 106 is usually the black wire. Attachment of the receiver ground wire connector 33 is done by placing the receiver ground wire connector 33 around the ground wire 106 and then squeezing or crimping the receiver ground wire connector 33 together to snap together and rigidly clamp the receiver ground wire connector 33 onto the ground wire 106 to mechanically and electrically connect the receiver ground wire connector 33 to the ground wire 106. Next, the consumer must connect the receiver input connector 26 to the low beam wire first connector 34 by pressing the two connectors together to snap them together or mate them together. As stated above, one connector is a female connector and the other connector is a male connector so they connect together just by pressing them together and snapping them into place. Next, the consumer must connect the receiver output connector 30 to the low beam wire second connector 36 by pressing the two connector together to snap them together or mate them together. As stated above, one connector is a female connector and the other connector is a male connector so they connect together just by pressing them together and snapping them into place. Then, the consumer may attach the receiver unit 10 to a solid piece of existing structure under the hood of the vehicle near the headlight 100 by screwing or bolting the receiver unit 10 to the solid piece of structure through the mounting hole 39 in order to hold the receiver unit 10 into place and lock it down to keep if free from falling off or vibrating.

Next, the consumer must install the transmitter unit 40 inside the cab or interior of the vehicle. First, the consumer should verify that the transmitter battery 50 is viable and charged and installed properly into the transmitter unit 40. Then, the consumer should pick a location that is within reach of the driver or the driver's seat and then install the transmitter unit 40 at this location. In best mode, the back side of the transmitter unit 40 has double sided tape or other adhesive on it to allow the consumer to easily peel off a backing paper to the adhesive and then just press and stick the transmitter unit 40 into place at the desired location. Note that the transmitter unit 40 inside can be installed without any tools. At this point, electronic device that temporarily turns off one headlight on a vehicle 5 is properly installed.

Electronic device that temporarily turns off one headlight on a vehicle 5 functions as follows. When the headlights are not on, and more specifically when the low beams are not on, electronic device that temporarily turns off one headlight on a vehicle 5 does not do anything when the transmitter unit button 42 is depressed. On the other hand, when the low beams are on, electronic device that temporarily turns off one headlight on a vehicle 5 turns off the low beam on the headlight that the receiver unit is attached to when the transmitter unit button 42 is depressed. The headlight then turns back on again when the transmitter unit button 42 is released. As stated, this gives off the appearance that the vehicle is winking when the transmitter unit button 42 is pressed. This is desirable because many drivers enjoy winking at other drivers as they pass by each other in order to acknowledge their presence and to "say hi" to each other as they drive by each other. In particular, Jeep® drivers really enjoy presenting this type of salutation to each other. Note that the applicant does not believe that this device poses any safety hazards because the wink only lasts for a fraction of a second and all other lights on the vehicle remain on during the wink.

Figure 10:
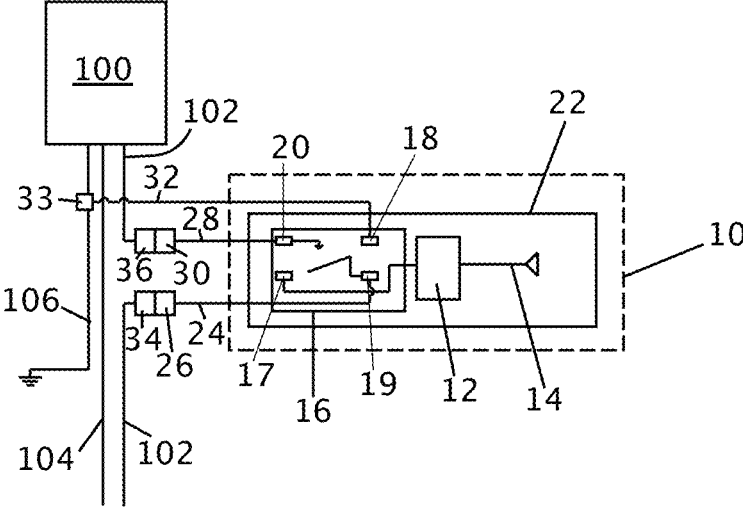
FIG. 10 is a circuit diagram of the receiver unit installed into the headlight wiring of a vehicle when the transmitter unit button is depressed.

Circuit diagrams of the operation of electronic device that temporarily turns off one headlight on a vehicle 5 are depicted in FIGS. 9 and 10. FIG. 9 depicts the circuitry when the transmitter unit button 42 is not depressed. When the transmitter unit button 42 is not depressed, the receiver relay 16 is closed, thereby allowing electrical current to pass freely to the headlight 100. FIG. 10 depicts the circuitry when the transmitter unit button 42 is depressed. When the transmitter unit button 42 is depressed, the receiver relay 16 is open, thereby cutting off electrical current to the low beam of the headlight 100, causing the low beam light on the headlight 100 to turn off. When the transmitter unit button 42 is released, the receiver relay 16 closes again, thereby allowing electrical current to pass freely to the headlight 100 and turning the low beam back on. FIG. 9 depicts the circuitry when the transmitter unit button 42 is released.

Very importantly, if the consumer changes his/her mind after installation of the electronic device that temporarily turns off one headlight on a vehicle 5, the electronic device that temporarily turns off one headlight on a vehicle 5 can be easily removed as follows. This invention must have the ability to be easily removed from the vehicle in a very quick fashion without the use of any tools. The consumer must detach the receiver ground wire connector 33 from the ground wire 106 by pulling the two halves of the splice connector apart in order to detach and remove the receiver ground wire connector 33 from the ground wire 106. Next the consumer must cover the splice area on the ground wire 106 with a length of electrical tape 116 in order to cover the bare wire areas on the ground wire 106 left over from the splice connection. Covering this bare wire area is required in order to protect the ground wire 106 from electrical shorting or water damage. Then, the consumer must disconnect the receiver output connector 30 from the low beam wire second connector 36 by pulling the two connectors apart. Then the consumer must disconnect the receiver input connector 26 from the low beam wire first connector 34 by pulling the two connectors apart. Next, the consumer can remove attachment screw holding the receiver unit 10 in place and then remove the receiver unit 10 entirely from underneath the hood of the vehicle. Next, the consumer can connect the low beam wire first connector 34 to the low beam wire second connector 36 by pressing the two connectors together to snap them together or mate them together.

Figure 11:
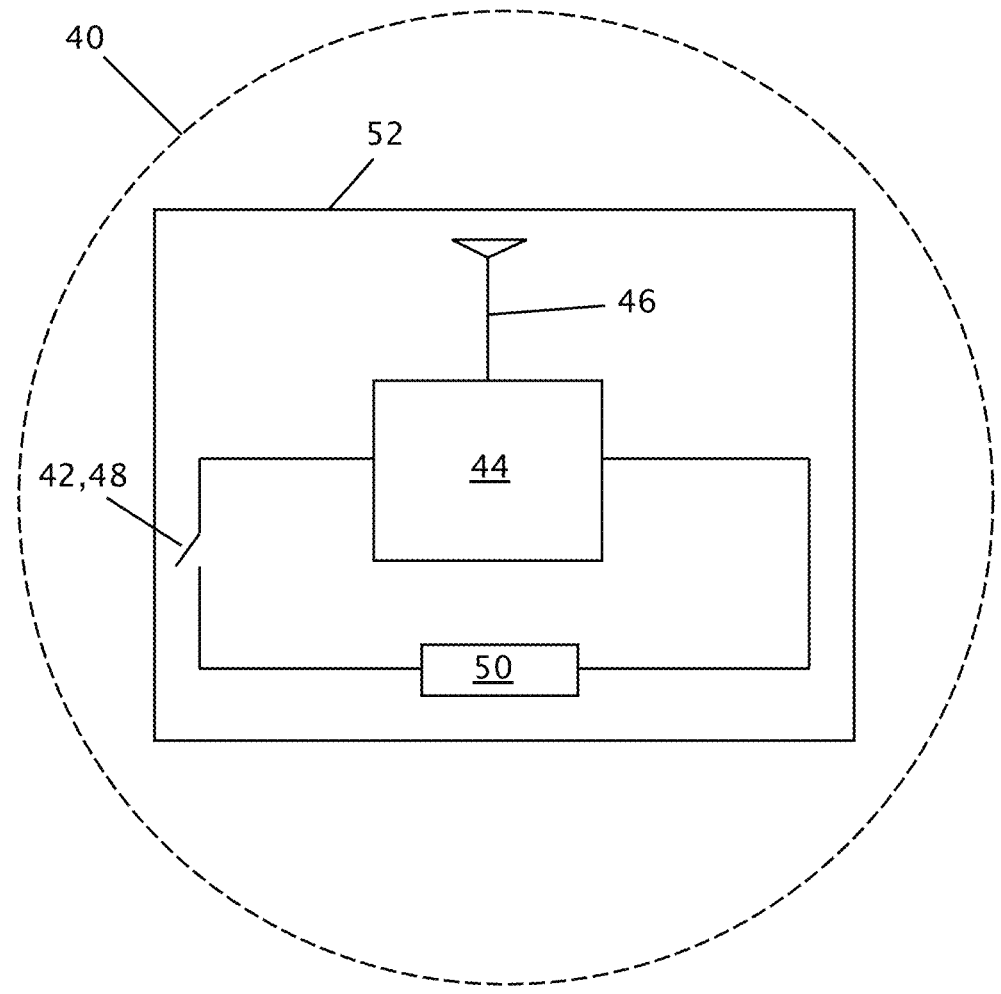
FIG. 11 is a circuit diagram of the transmitter unit.
Figure 12:
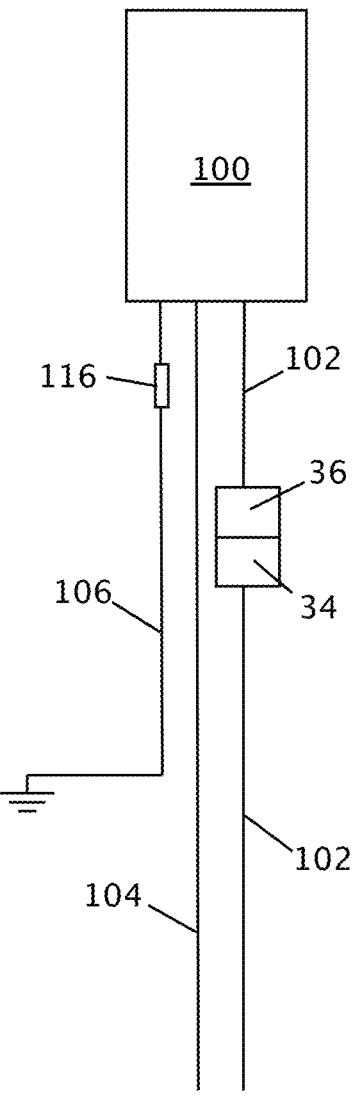
FIG. 12 is a circuit diagram of the headlight wiring of a headlight on a vehicle after the receiver unit has been removed from the headlight wiring of a vehicle.

Thus, removal of the electronic device that temporarily turns off one headlight on a vehicle 5 can be performed by the consumer without attaching or removing any more electrical connectors to make removal of the electronic device that temporarily turns off one headlight on a vehicle 5 very easy and fast. FIG. 11 is a circuit diagram depicting the vehicles headlight wiring after the electronic device that temporarily turns off one headlight on a vehicle 5 is properly removed. Note that removal of the electronic device that temporarily turns off one headlight on a vehicle 5 can be performed without any tools.

What is claimed is:

1. Electronic device that temporarily turns off one headlight on a vehicle comprises: a receiver unit and a transmitter unit; wherein, said receiver unit comprises: a radio frequency receiver; a receiver antenna; a receiver relay; a receiver printed circuit board; a receiver input wire; a receiver input connector; a receiver output wire; a receiver output connector; a receiver ground wire; a receiver ground wire connector; a low beam wire first connector; a low beam wire second connector; and a receiver unit case, wherein, said radio frequency receiver is a small electronic device used to receive radio signals from said transmitter unit through said receiver antenna, said radio frequency receiver is a short range receiver that receives radio signals between 250-550 megahertz inclusive, said radio frequency receiver is rigidly attached to said receiver printed circuit board, said radio receiver has a first contact that is connected to a first input terminal first on said receiver relay, said radio receiver has a second contact that is connected to said receiver antenna, said receiver antenna is a small electronic device that generates electric currents from radio waves propagating through space, said receiver antenna is rigidly attached to said receiver printed circuit board, said receiver relay is a small electronic device that is an electrically operated switch known as a relay, said receiver relay is rigidly attached to said receiver printed circuit board, said receiver relay has: a first input terminal, a second input terminal, a first operating terminal, and a second operating terminal, said receiver printed circuit board is a rigid structure that contains electrical circuitry, said receiver input wire is a length of metallic wire coated with a layer of insulating material with a first end that is connected to said receiver input connector and a second end that is connected to said first operating terminal of said receiver relay, said receiver input connector is an electrical connector that is an electromechanical device used to create an electrical connection between parts of an electrical circuit, said receiver output wire is a length of metallic wire coated with a layer of insulating material with a first end that connected to said second operating terminal of said receiver relay and a second end that is connected to said receiver output connector, said receiver output connector is an electrical connector that is an electromechanical device used to create an electrical connection between parts of an electrical circuit, said receiver ground wire is a length of metallic wire coated with a layer of insulating material with a first end that is connected to said second input terminal of said receiver relay and a second end that ss connected to said receiver ground wire connector, said receiver ground wire connector is an electrical connector that is an electromechanical device used to create an electrical connection between parts of an electrical circuit and is a splice connector that is capable of electrically connecting to an existing electrical wire without cutting or modifying said existing electrical wire, said low beam wire first connector is an electrical connector that is an electromechanical device used to create an electrical connection between parts of an electrical circuit said low beam wire first connector is connected to a first end of a severed low beam electrical wire of a vehicle, said low beam wire first connector is reversibly attachable or reversibly connectable to said receiver input connector and to said low beam wire second connector by hand without tools, said low beam wire second connector is an electrical connector that is an electromechanical device used to create an electrical connection between parts of an electrical circuit, said low beam wire second connector is connected to a second end of said severed low beam electrical wire of said vehicle, said low beam wire second connector is reversibly attachable or reversibly connectable to said receiver output connector and to said low beam wire first connector by hand without tools, said receiver unit case is a rigid hollow member that houses and protects said receiver printed circuit board, said transmitter unit comprises: a transmitter unit button; a radio frequency transmitter; a transmitter antenna; a transmitter switch; a transmitter battery; a transmitter printed circuit board; and a transmitter unit case, wherein, said transmitter unit button is a user interface which a user can press in order to energize or power up said radio frequency transmitter, said transmitter unit button is an electrical switch which closes an electrical circuit between said transmitter battery and said radio frequency transmitter, said radio frequency transmitter is a small electronic device used to transmit radio signals to said receiver unit, said radio frequency transmitter is a short range transmitter that transmits radio signals between 250-550 megahertz inclusive, said radio frequency transmitter is rigidly attached to said transmitter printed circuit board, said radio frequency transmitter has a first terminal contact that is connected to that is connected to said transmitter unit button, said radio frequency transmitter has a second terminal or contact that is connected to said transmitter battery, said transmitter antenna is a small electronic device that generates radio waves that propagate through space from electric currents, said transmitter antenna is rigidly attached to said transmitter printed circuit board, said transmitter switch is an electrical switch which closes an electrical circuit between said transmitter battery and said radio frequency transmitter, said transmitter switch is rigidly attached to said transmitter printed circuit board, said transmitter switch is connected to said radio frequency transmitter and to said transmitter battery, said transmitter battery is a source of electric power consisting of one or more electrochemical cells with external connections, said transmitter battery is rigidly attached to said transmitter printed circuit board, said transmitter battery is connected to said radio frequency transmitter and to said transmitter switch, said transmitter printed circuit board is a rigid structure that contains electrical circuitry, and said transmitter unit case is a rigid hollow member that houses and protects said transmitter printed circuit board.

* * * * *